Figure 1:
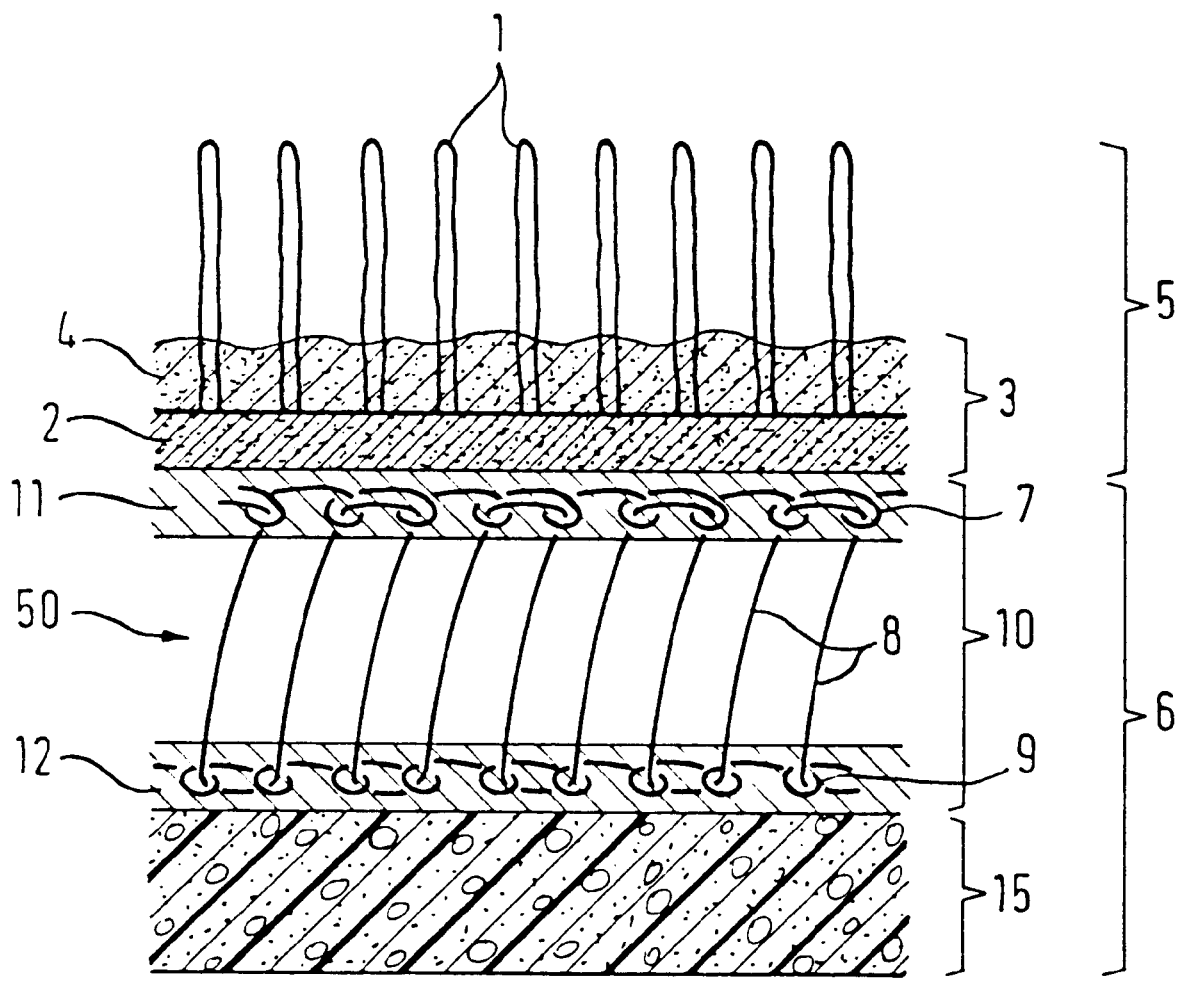

United States Patent [19]
Muhlberger

[11] Patent Number: 5,908,673
[45] Date of Patent: Jun. 1, 1999

[54] TEXTILE DAMPING MATERIAL AND TEE-OFF GOLFING MAT AND IMPACT AND WATER ABSORBING MAT MADE THEREOF

[75] Inventor: Peter Muhlberger, Herzberg, Germany

[73] Assignee: Gebr. Wunderlich GmbH & Co. KG, Osterode, Germany

[21] Appl. No.: 08/801,433

[22] Filed: Feb. 18, 1997

[30] Foreign Application Priority Data

| Feb. 15, 1996 | [DE] | Germany | 296 02 701 |
| Feb. 22, 1996 | [DE] | Germany | 296 03 229 |
| Jul. 17, 1996 | [DE] | Germany | 196 28 856 |
| Sep. 23, 1996 | [DE] | Germany | 196 39 006 |

[51] Int. Cl.$^6$ ..................................................... A01N 3/00
[52] U.S. Cl. .............................. 428/17; 428/95; 428/96; 428/97; 428/116; 428/136; 428/138; 273/317.2
[58] Field of Search ..................... 428/95, 96, 97, 428/116, 136, 138; 66/196; 139/410; 273/317.2

[56] References Cited

U.S. PATENT DOCUMENTS

| 4,735,427 | 4/1988 | Fuchs | 280/152 R |
| 5,026,580 | 6/1991 | Hammon | 428/17 |
| 5,385,036 | 1/1995 | Spillane et al. | 66/87 |

FOREIGN PATENT DOCUMENTS

| 2164791 | 6/1996 | Canada | B62D 25/18 |
| 2203721 | 8/1973 | Germany | B62D 85/18 |
| 3428906 | 2/1986 | Germany | B62D 25/16 |
| 3539146 | 5/1987 | Germany | B62D 25/16 |
| 4240935 | 6/1994 | Germany | B62D 25/18 |
| 4443678 | 6/1996 | Germany | G10K 11/168 |

*Primary Examiner*—Christopher Raimund
*Attorney, Agent, or Firm*—Galvin & Palmer

[57] ABSTRACT

Disclosed is a textile damping material which has the structure of a flexible, three-dimensional, textile spacing structure (50) which is stable in respect of shape. The spacing structure (50) has an upper layer portion (7) and a lower layer portion (9) which are made up of single-thread or multi-thread yarn, wherein the two layer portions (7, 9) are spaced from each other and connected to each other by elastic pile threads (8).

Also disclosed is an impact and water absorbing mat for motor vehicles and a tee-off golfing mat, each obtained by use of the textile damping material. The tee-off golfing mat has a damping layer (10).

16 Claims, 5 Drawing Sheets

TEXTILE DAMPING MATERIAL AND TEE-OFF GOLFING MAT AND IMPACT AND WATER ABSORBING MAT MADE THEREOF

DESCRIPTION

The invention concerns a textile damping material and use thereof as a damping layer for a textile multi-layer article and as impact absorbing mat. It also concerns a tee-off golfing mat and an impact and water absorbing mat for motor vehicles.

In many technical sectors there is a wish to have available materials which are capable of absorbing punctiform impacts and thus having a damping action.

An example of this area of problems are tee-off golfing mats. Such mats are used by golfers to practice teeing-off outside the teeing-off areas and possibly on a driving range. The use of unmodified artificial turf material for tee-off golfing mats is known, but they have only a very limited service life.

German Utility Model No. 295 08461.8 described an artificial turf-based tee-off golfing mat in which the artificial turf piles are anchored in a backing fabric. To improve the service life the piles are embedded into a stabilisation layer arranged on the backing fabric. A preferred embodiment of this tee-off golfing mat has a bottom layer which is joined to the underside of the backing fabric.

That arrangement provides for a marked improvement in the service life. Nonetheless, in the case of tee-off golfing mats which are the subject of a great deal of play thereon, delamination phenomena in respect of the artificial turf and the bottom layer occur, whereby the tee-off golfing mat can become unusable at the teeing-off side. That is to be attributed to the fact that tee-off golfing mats are mostly used by less skilled players who only relatively infrequently hit the ball directly and centrally. Either the club hits the ground first, slides over the ground and then hits the ball, or the player first hits the ball and then scrapes a certain distance along the ground with the club. In that case, the absence of damping of the ground means that practically the entire kinetic energy of the club is converted into shearing forces which practically "cut off" the artificial turf pile.

Ground contact which occurs without a damping action also has the result that, with a high tee-off rate, the tee-off golfing mat is subjected to such a high impact loading that the above-mentioned delamination phenomena occur. Finally, it is also responsible for the fact that the joints of the person playing golf are subjected to an extreme loading.

At the present time no tee-off golfing mat which has a damping effect adequate for resolving that problem is known. A tee-off golfing mat of that kind would make a contribution to increasing the service life and would also protect the joints of the player because the kinetic energy of the club is absorbed and neither converted into shearing forces nor transmitted to the tee-off golfing mat or to the joints of the player.

In the motor vehicle sector there is the problem of screening the interior of a motor vehicle from the effect of sound from the exterior, to the maximum possible degree. That involves not only sound-proofing measures which prevent engine noises from being transmitted into the interior of the vehicle by the installation of sound-proofing partitions, but also the elimination of sound influences deriving from other sources.

A particularly unpleasant source of noise when driving a motor vehicle occurs when the motor vehicle is travelling on a gravel track and the gravel is thrown up by the tires and hits against the wheel arches or casings and other parts of the underneath of the motor vehicle. That then involves an unpleasant clattering noise which requires special sound-insulation measures. Noises of that kind occur however not only due to gravel, stones or pebbles but also when the motor vehicle is driven quickly through a puddle of water or through mud or slush. Besides the noise which is produced there is also the risk of mechanical damage to the wheel arches or casings and the underside structure of the motor vehicle when stones or the like are thrown up.

DE-A1 30 22 461 describes a multi-layer anti-boom covering strip for metal vehicle body panels with a foam layer which can be glued onto the metal body panel and a structure of high tensile strength, which is joined to the top side of the foam layer. The foam layer comprises polypropylene of a given weight in relation to surface area, while the structure of high tensile strength is a mesh-like structure which is fixed by welding and is also of a given weight in relation to surface area.

DE-A1 30 39 651 discloses a shaped plate which absorbs sound that is transmitted by air, the plate comprising a fleece of polyester fibers and selectively an air-permeable covering layer. The fleece is glued with a cross-linked binding agent and during the manufacturing process is compressed in such a way as to afford a given flow resistance.

A problem which also arises in the motor vehicle sector is that of providing water absorbers for anti-spray systems. The purpose thereof is to reduce the formation of spray water due to the tires of moving vehicles, insofar as spray water is absorbed and drained away by a suitable configuration in respect of the wheel arches or casings of the vehicle. A possible way of doing that is lining the wheel arches or casings with a water absorber. The technical details and the operational data required in practice of anti-spray systems are the subject of an EEC Directive (Council Directive of Mar. 27th, 1991, Official Journal of the European Community of Apr. 23rd, 1991, No. L 103/5-28, in particular L 103/11). In accordance with that Directive a water absorber must absorb at least 70% of the water which is thrown up and drain it away as flowing water. The Directive includes a detailed testing procedure for ascertaining the operational data of a water absorber.

DE-A1 42 13 404 and application for a patent of addition thereto, DE-A1 42 15 091, describe a water absorber for an anti-spray system, in particular for motor vehicle wheel covers. The water has a transmission layer with a high level of permeability for water entering same, and an impingement zone disposed behind the transmission layer in the direction in which water enters the absorber. In a preferred embodiment of the parent application the transmission layer comprises a needled felt with a back covering, wherein there are provided spacers in the form of conical elements which provide for spacing the transmission layer from an impingement surface. In the application for the patent of addition the surface of the transmission layer, which is towards the water entering the absorber, is provided with drainage grooves. Due to the combination of the transmission layer with an impingement zone, the water absorbers of that state of the art involve two-layer absorbers.

The object of the present invention is to provide a damping material which can be employed in a versatile manner. Aspects of this object are the provision of a tee-off golfing mat with improved damping and service life, and an impact and water absorbing mat which can be used for motor vehicles.

That object is attained by a tee-off golfing mat as set forth in claim 1. Further developments of those subjects of the invention are recited in the respective appendant claims.

The textile damping material according to the invention has the structure of a flexible, three-dimensional, textile spacing structure which is stable in respect of shape, and has an upper material layer portion and a lower material layer portion which are made up from single-thread or multi-thread yarn and which are spaced from each other and connected to each other by elastic pile threads.

A preferred spacing structure is a knitted material, a woven material or a loop-mesh material, in which the pile threads comprise single-thread wire which is elastic in respect of shape. Generally stability in respect of shape and flexibility of the spacing structure according to the invention are afforded predominantly by the stiffness of the pile threads which are bound both into the lower and also the upper layer portions. The pile threads are passed endlessly to and fro between the upper and lower layer portions, that is to say they come from the lower layer portion, pass through the upper layer portion, reverse their direction and run back to the lower layer portion, and so forth. They stabilise the spacing structure in that way. Single-thread pile threads afford a particular degree of stiffness with at the same time elasticity in respect of shape and thus give a spacing structure which is stable in respect of shape and at the same time flexible. Pile threads in the form of single-thread wire which is elastic in respect of shape are therefore particularly preferred; in that respect the thickness of the single-thread wire is preferably in a range of between 0.1 and 1 mm.

On the whole, mostly preferred at the present time is a spacing structure in the form of a double-rib textile plastic knitted material with a single-thread wire which is elastic in respect of shape as the pile threads, in which the upper and lower layer portions are also made up of single-thread wire.

The textile spacing structure should preferably not be absorbent so that the absorption of water when travelling along a wet road is as low as possible. Preferably therefore the spacing structure comprises plastic material, with polyester or polyamide being particularly preferred because of the stability in respect of shape which can be attained therewith. In addition it is also possible in principle to use polyethylene, polypropylene, polyvinyl chloride or mixtures thereof.

For usual purposes the spacing between the upper and the lower layer portions (which is essentially determined by the length of the pile threads) is between 2 and 20 mm, preferably 4 and 20 mm.

In accordance with the invention the above-described damping material is used as a damping layer for a multi-layer textile article or as an impact and water absorbent mat. The first use results in a tee-off golfing mat with greatly improved damping and service life, while the second affords an impact and water absorbent material for motor vehicles enjoying excellent properties.

The stability in respect of shape and flexibility of the textile damping material according to the invention, when subjected to a compression loading, are surprising. Admittedly three-dimensional textile structures are known from the area of technical textiles and are used for many purposes such as for example for back ventilation for preventing condensation of water (for example beneath mattresses and in the interior of sailing yachts), for drainage systems, for the internal cushioning lining of crash helmets, for reinforcing composite materials and as anti-spray water arrangements for trucks. What is unexpected however is their capability of absorbing punctiform impacts if they are constructed in accordance with the invention from an upper and a lower layer portion which are connected together by elastic pile threads.

The stability in respect of shape and flexibility can easily be evaluated by loading with the palm of the hand. In that situation the material according to the invention behaves in a similar manner to corrugated cardboard, that is to say it admittedly yields when the loading exceeds a given amount, but up to that point it is relatively stable and, in contrast to corrugated cardboard, it returns to its original shape again after it has yielded; the elastic pile threads therefore briefly bend but when the loading is removed they return to their original configuration again.

That therefore affords a structure which affords surprisingly good suitability as an impact absorbing material. If that structure is used as a damping layer between the artificial turf layer and the bottom or ground layer of an artificial turf-based tee-off golfing mat, the result is a greatly improved product with a longer service life which, even with a high driving-off rate, has little tendency to delamination because the impacts imparted by the golf club in punctiform fashion are adequately damped. If the wheel arches or casings (or the underside) of a motor vehicle are clad with such a material, stones or other small solid pieces which are thrown up impact against the lower layer portion, briefly deform the material by virtue of bending of the elastic pile threads, and are thrown off again. As the stones which are thrown up do not reach the sheet metal of the body of the motor vehicle, the clattering noise which is perceived as a noise nuisance is prevented and a high level of acoustic damping is attained.

Besides the uses described in detail herein as a damping layer for a tee-off golfing mat and as an impact absorbing mat for motor vehicles, the textile damping material according to the invention can be used generally as a damping layer for any multi-layer textile article and is particularly suitable for any kind of ground covering article.

An artificial turf-based tee-off golfing mat according to the invention has a backing woven material with artificial turf piles anchored therein and in addition carries an impact absorbing damping layer which is joined to the underside of the backing fabric. The damping layer is formed by a flexible three-dimensional, textile spacing structure which is stable in respect of shape and which has an upper material layer portion and a lower material layer portion. The layer portions are made up of single-thread or multi-thread yarn and are spaced from each other and connected to each other by resilient pile threads.

Preferably the textile spacing structure is a double-rib textile plastic knitted material whose upper layer portion is made up of multi-thread yarn and whose layer lower portion is made up of single-thread wire. For fixing purposes the upper and/or the lower layer portion of the spacing structure can be anchored in an upper and a lower carrier layer respectively.

The artificial turf piles are preferably embedded at their side towards the backing woven fabric into a stabilisation layer which is arranged on the backing woven fabric. In order to guarantee anchoring of the pile in the desired manner the thickness of the stabilisation layer should be at least 10% of the pile length, in which respect a range of between 10 and 50% is preferred, depending on the materials used for the pile and the properties attained thereby in terms of elasticity and stability in relation to shearing forces. A particularly preferred embodiment is one in which the pile length is between 5 and 15 mm and the thickness of the stabilisation layer is between 1 and 5 mm. In this respect the term "pile length" means the part of the pile which projects out of the backing woven material.

A particularly preferred embodiment is one in which embedding of the pile is effected with a stabilisation material which extends in the form of a solidified impregnation through the backing woven material and which additionally forms the stabilisation layer on the top side of the backing woven material. The advantages of this embodiment are conditioned in terms of manufacturing procedure. The backing woven material of an unmodified artificial turf (that is to say in the initial condition) is relatively absorbent and can be easily impregnated with a solidifiable plastic sol from the underside of the backing material. If that procedure is controlled in such a way that the plastic sol involves not only the thickness of the backing material but also penetrates to a certain height into the region of the pile which is disposed thereabove, it is possible in that fashion in a simple procedure to control the thickness of a stabilisation layer which can then be formed by hardening the plastic sol. It has also been found that the solidified impregnation makes an additional contribution to anchoring the pile.

Suitable materials for the stabilisation layer (or the stabilisation material) are solidified plastics such as polyvinyl chloride (PVC), acrylate, butadiene styrene, polyamide (PA), polyurethane (PU), polyester (PES), mixed or graft polymers of PVC, polyvinylidene chloride (PVDC), polyethylene (PE), ethylene vinyl acetate (EVA), rubber, in particular ethylene/propylene rubber, PVC/acrylate mixtures or latex or generally mixtures of various thermoplastic materials or elastomers. A solidified adhesive is also suitable. Soft PVC is preferred.

Semi-rigid single-thread portions of polyethylene, polypropylene, PVC, polyamide, polyacrylonitrile, polyester or PVC-vinal are suitable for the pile of the artificial turf, wherein polyamide and polypropylene are particularly preferred by virtue of their elasticity.

Tufted, woven, knitted, loop-mesh or double-rib material as well as spun fleece or needled felt are suitable for the backing material of the artificial turf.

In accordance with a preferred embodiment the tee-off golfing mat is reinforced with a bottom or ground layer which is joined to the underside of the impact absorbing damping layer. A suitable material for the bottom layer is for example foamed plastic material of a thickness of between about 3 and 12 mm. The bottom layer forms together with the impact absorbing damping layer an underneath layer of the tee-off golfing mat.

Tee-off golfing mats can be put on the market in a size of for example 1.5 m×1.5 m. Bores or slots of a depth of between 3 and 7 mm can be stamped or milled into the mat from the side of the artificial turf, which serve to accommodate the tee. The embodiment with a bore precisely specifies the position of the tee while the embodiment with a slot affords the golfer the option of finding out the driving-off position for himself. If a plurality of driving-off positions are possible, that increases the service life of the tee-off golfing mat because it is possible gradually to play off the entire surface area of the mat, by altering the driving-off position. The stabilisation layer also affords better guidance for the inserted tees so that they stand more securely and make it easier to drive off.

Production of the tee-off golfing mat according to the invention can be effected on conventional production lines which are known to the man skilled in the art in the area of the production of technical textiles.

Firstly the artificial turf material is impregnated from the rear side with a plasticisable compounding paste (soft PVC is preferred), the paste being applied in such a way that it penetrates through the backing material and encloses the pile up to a height of between 1 and 5 mm, preferably about 2 mm. The paste is then plasticised, which can be effected for example by a thermal procedure. The artificial turf when pre-treated in that way is provided at the side of the backing material with the impact absorbing damping layer in a lining process (welding, gluing, "wet-in-wet" process).

To produce the damping layer the spacing structure is continuously produced by knitting, weaving or a loop mesh-forming procedure and passed to a production line (either directly or after intermediate storage in the form of rolled-up webs). In the production line the downwardly facing side of the spacing structure is firstly continuously coated with a compounding paste. In the coating operation the paste penetrates into the layer portion of the treated side, this provides the prerequisites for subsequent anchoring therein. The paste is then thermally plasticised and the first of two carrier layers is formed. The article is then turned over and the second layer portion which now faces upwardly is coated with compounding paste in the same manner. The second carrier layer is produced by plasticisation of the paste. At the end of the production line the raw article produced in that way is either directly subjected to further processing or, prior to further processing, it is rolled up in the form of wide webs for intermediate storage. Further processing is effected by applying the rough article to the pretreated artificial turf as a lining thereon (for example by welding). Finally, to form the bottom layer, a prefabricated mat is applied as a lining to the lower carrier layer, said mat being formed from a textile carrier which is coated with a plasticised compound on both sides. The bottom layer and the impact absorbing damping layer together form the underneath layer of the tee-off golfing mat.

An impact and water absorbing mat according to the invention has the structure of a flexible, three-dimensional, textile spacing structure which is stable in respect of shape and which has an upper material layer portion and a lower material layer portion which are made up of single-thread or multi-thread yarn. Both layer portions are spaced from each other and connected to each other by elastic pile threads, wherein at least the lower layer portion has a water-permeable sieve structure.

In accordance with the invention the lower layer portion has a water-permeable sieve structure. The turn "lower layer portion" in accordance with the invention means the layer portion which is exposed to the external impact influences, that is to say when used in relation to a motor vehicle, it is not in contact with parts of the motor vehicle body. In a corresponding manner "upper layer portion" means the oppositely disposed layer portion which bears against the motor vehicle.

The water-permeable sieve structure of the lower layer portion acts as a coarse filter for stones and larger pieces of mud and prevents them from penetrating into the mat. Water can admittedly penetrate into the mat due to the water-permeability of the sieve structure, but it drains away unimpededly again. In relation to spray water the space between the layer portion and the body serves as an impingement and calming zone in which the water which has penetrated thereinto loses its energy, due to continuous reflection, and in that way is calmed. Accordingly the impact absorbing mat according to the invention additionally performs the function of a water absorber for an anti-spray system in accordance with German patent application DE-A1 42 13 404 or application of addition DE-A1 42 15 091.

The double function of the mat according to the invention of having both an impact absorbing action and a water absorbing action is surprising and fulfils an urgent need in the motor vehicle sector. For the first time a material is made available, with which it is possible simultaneously to solve the problem of sound insulation and spray protection.

The sieve structure of the lower layer portion can be achieved by giving that layer portion a given open surface area in production using manufacturing processes in textile technology (for example by knitting, weaving or forming a loop mesh material). Preferably the open surface area is in a range of between 10 and 40% of the total surface area of the lower layer portion.

In contrast to the lower layer portion the upper layer portion must not have any water-permeable sieve structure as it bears against the body of the motor vehicle.

Particularly preferred is a spacing structure whose internal volume (that is to say the volume between the upper and the lower layer portions) forms a space extending continuously through the spacing structure. This embodiment promotes unimpeded reflection of the water which has penetrated thereinto, and calming thereof. It also provides that any fine mud which has penetrated into the mat can be better flushed out.

The use of the spacing structure as an impact and water absorbing mat, in accordance with the invention, involves covering a surface which is exposed to impacts, in the region of the wheel arches or casings or the underside, with the spacing structure. The spacing structure can be fixed in position there (preferably by gluing). In the event of use in the motor vehicle sector, it is preferred for the upper layer portion which bears against the vehicle body to be covered with a layer of plastic material which then functions as an intermediate layer between the upper layer portion and the vehicle body. That intermediate layer can be made from the same materials as the spacing structure itself.

It will be appreciated that the mat according to the invention can be used not only for motor vehicles but also in all other areas where a surface which is exposed to impacts has to be protected in order to reduce or eliminate either the production of noise or mechanical damage.

Figure 2:
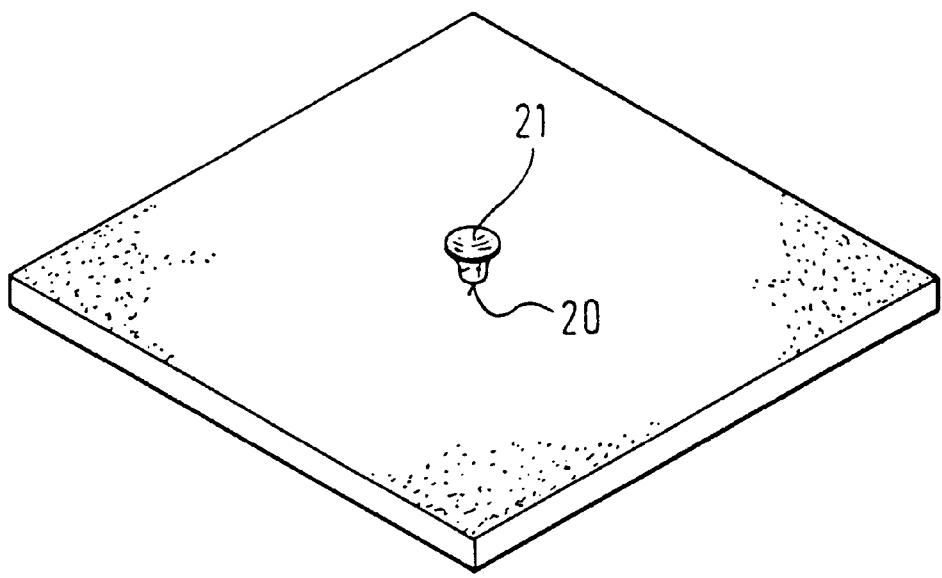
Figure 3:
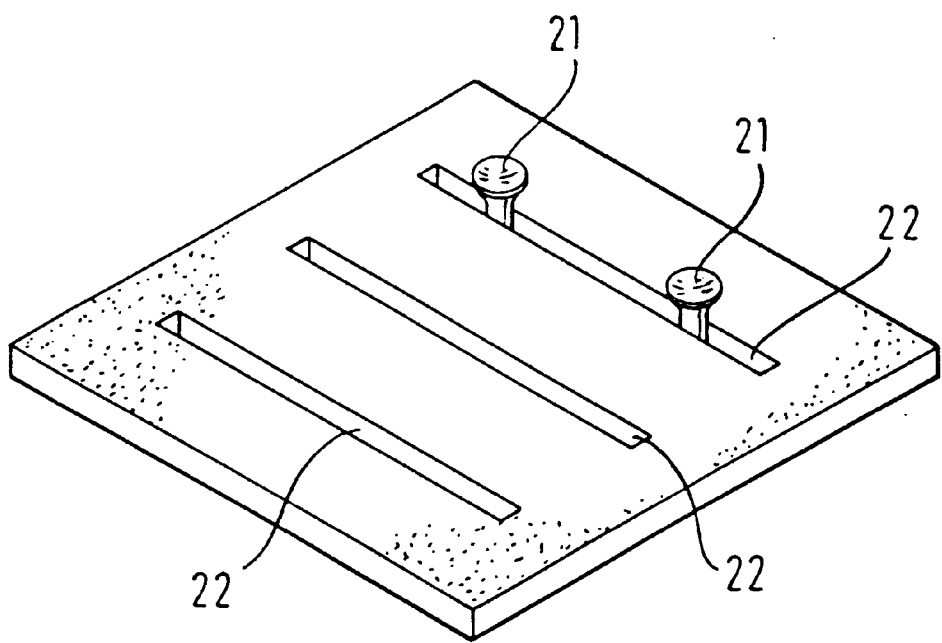
Figure 4:
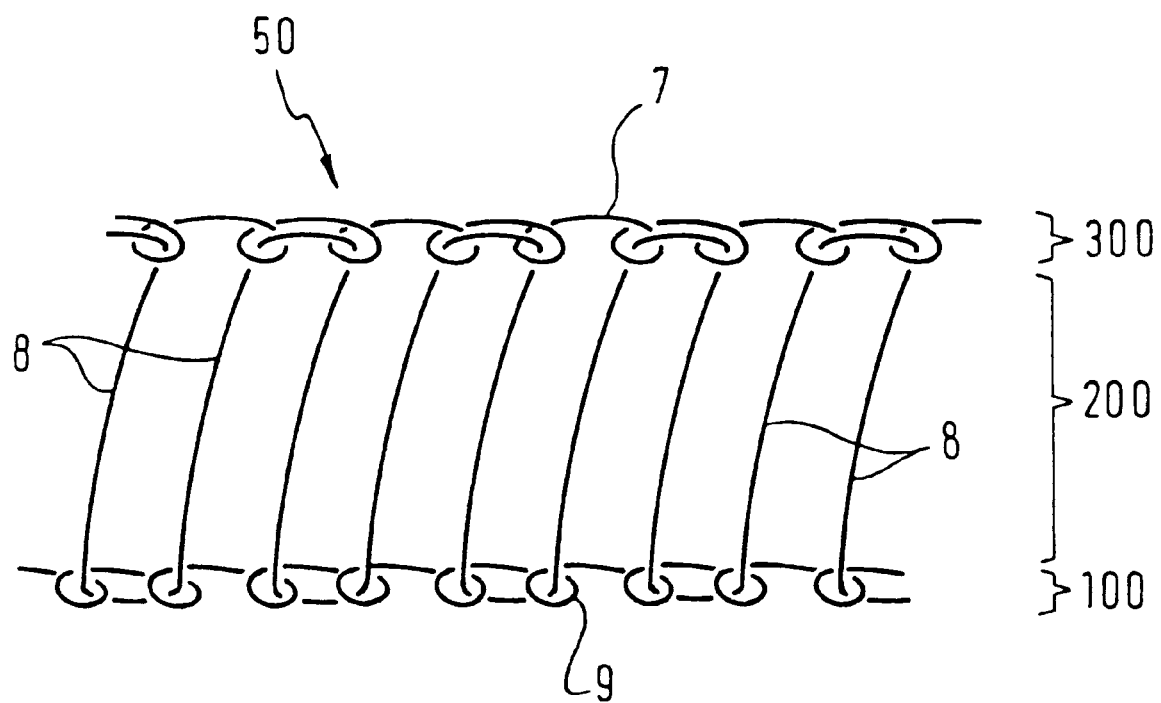
Figure 5:
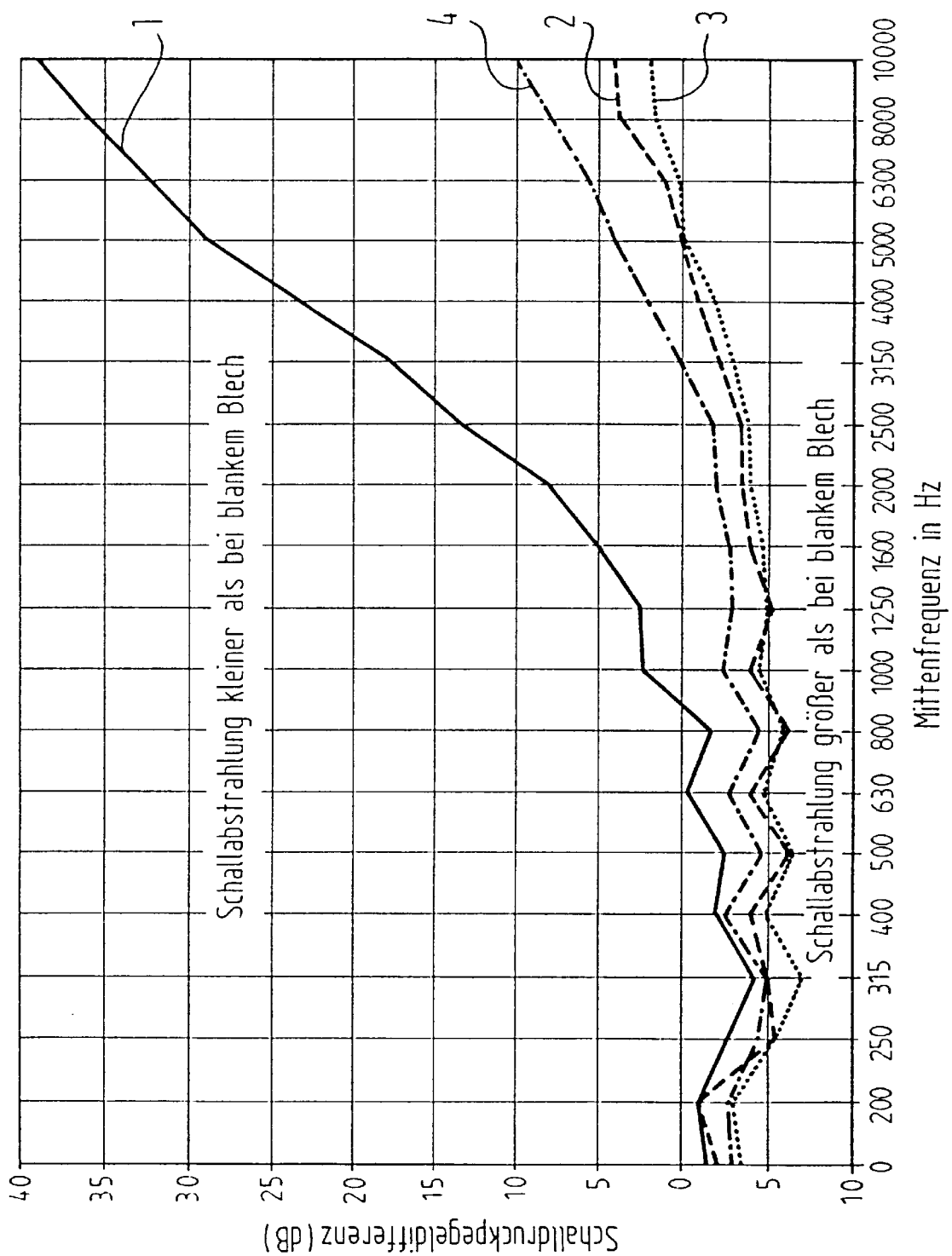
Figure 6:
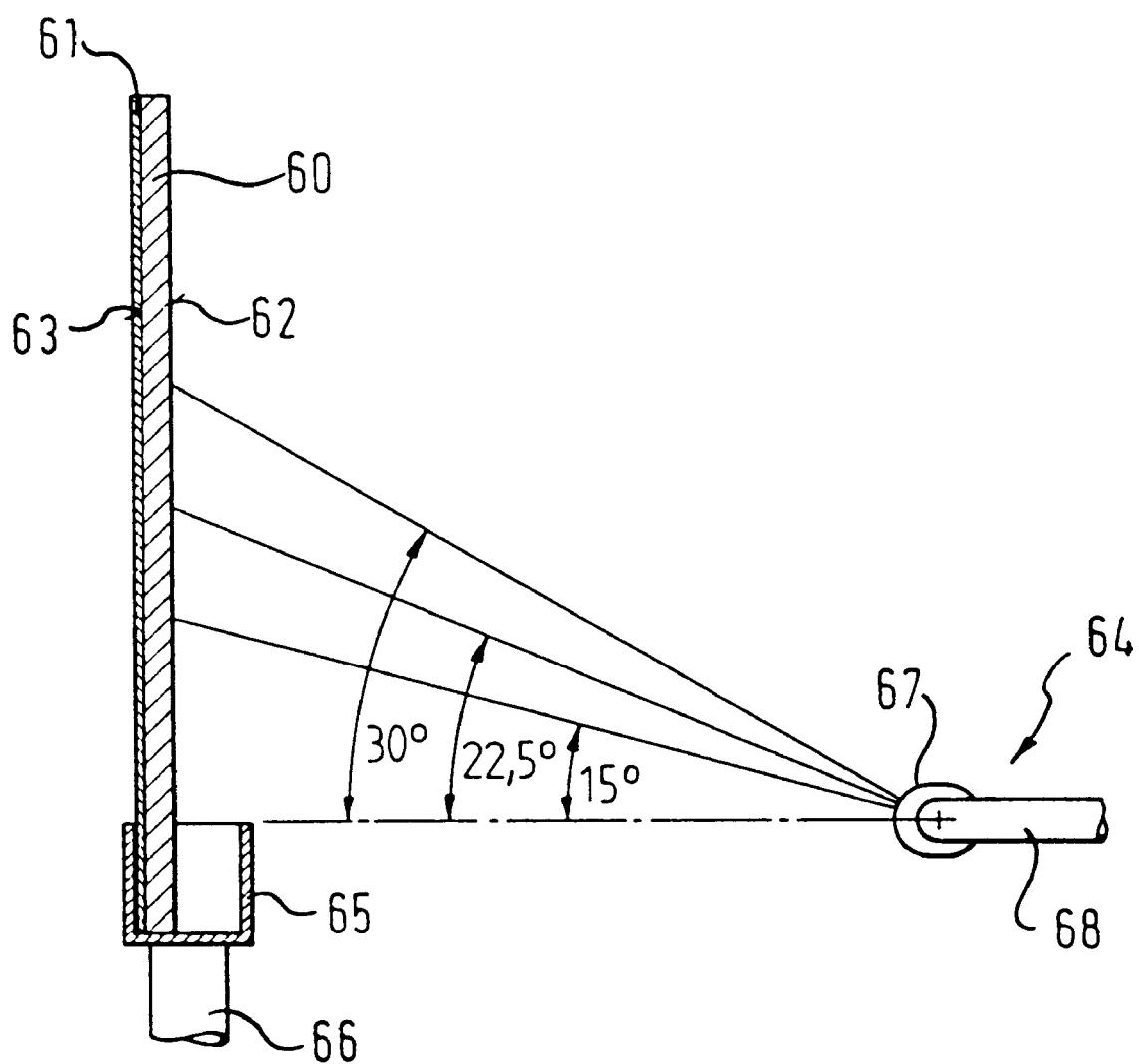

Further advantages, features and possible uses of the invention are apparent from the following description of preferred embodiments with reference to the drawing in which:

FIG. 1 is a sectional view of an embodiment of the tee-off golfing mat according to the invention, FIG. 2 shows a tee-off golfing mat according to the invention with a bore for accommodating an individual tee, FIG. 3 shows a tee-off golfing mat according to the invention with slots for accommodating a plurality of tees, FIG. 4 is a view in section through a damping material according to the invention or an impact and water absorbing mat according to the invention, FIG. 5 shows the result of measurement of the sound radiation in the event of stone strike excitation of a motor vehicle sheet metal portion which was protected with the impact absorbing mat according to the invention and with impact absorbing materials of the state of the art, and FIG. 6 is a view in section of a "test arrangement for testing anti-spray arrangements of the water absorber type" in accordance with the above-specified EEC Directive.

FIG. 1 shows an embodiment of a tee-off golfing mat according to the invention which is made up from an artificial turf layer 5 and a bottom or ground layer 6.

The artificial turf layer 5 is formed by a backing material 2 with piles 1 anchored therein. To improve the anchoring of the pile 1 the backing material 2 is impregnated with a hardened stabilisation material 3 which on the other side of the backing material 2, in addition to the impregnation, forms a stabilisation layer 4. Welded to the backing material 2 is an underneath layer 6 which comprises an impact absorbing damping layer 10 and a bottom layer 15.

In the illustrated embodiment the impact absorbing damping layer 10 is 12 mm in thickness and the underneath layer is 6 mm in thickness so that the thickness of the bottom layer 6 is a total of 18 mm. With a thickness of the backing material of 2 mm and a pile length of 10 mm, that gives an overall thickness for the tee-off golfing mat of 30 mm. The thickness of the stabilisation layer 4—due to the production procedures involved—is not constant over the entire surface area of the tee-off golfing mat but is in the range of between 2 and 4 mm.

The impact absorbing damping layer 10 is made up from the textile damping material according to the invention in the form of a spacing structure which is here in the form of a double-rib spacing knitted material 50. The spacing material 50 has an upper layer portion 7 and a lower layer portion 9 which are spaced from each other and connected to each other by elastic resilient pile threads 8. As can be clearly seen the pile threads 8 are guided to and fro endlessly between the upper and lower layer portions, that is to say they come from the lower layer portion 9, pass through the upper layer portion 7, reverse their direction and go back to the lower layer portion 9 and so forth. They thus have a stabilising action and that affords a spacing structure 50 which is stable in respect of shape and at the same time flexible.

In the illustrated example the lower layer portion 9 and the resilient pile threads 8 are made up of a single-thread wire of polyester (PES) of a thickness of 0.2 mm. The upper layer portion 7 comprises multi-thread yarn. The layer portions 7, 9 are each anchored in a respective carrier layer (upper carrier layer 11, lower carrier layer 12).

The bottom layer 15 comprises foamed PVC and has a textile carrier (not shown).

FIG. 2 shows a tee-off golfing mat according to the invention measuring about 1.50 m×1.50 m which approximately centrally (that is to say at the point of intersection of the diagonals) has a bore 20 into which a tee 21 is inserted. FIG. 3 shows a corresponding tee-off golfing mat but with slots 22 into which a plurality of tees 21 can be inserted.

FIG. 4 shows a view in section through the textile damping material according to the invention or an impact and water absorbing mat according to the invention. The mat has the structure of a spacing structure 50 having an upper layer portion 7 and a lower layer portion 9. The two layer portions 7, 9 are spaced from each other and connected to each other by elastic pile threads 8. As in FIG. 1, it can also be clearly seen from this Figure that the pile threads 8 are passed to and fro endlessly between the upper and lower layer portions 7, 9. This arrangement gives three layer regions which are respectively identified by 100, 200 and 300. The layer regions 100 and 300 are formed by the two layer portions 9, 7, while the layer region 200 forms the volume between the layer portions 9, 7.

As can also be seen the pile thread 8 which provides the spacing effect is formed by a single-thread wire. The portions of the single-thread pile thread 8 extend substantially parallel to each other in the layer 200 (as also in FIG. 1). The upper layer portion 7 and the lower layer portion 9 also comprise single-thread wire, wherein in the illustrated embodiment the same single-thread wire which consisted of polyester was used for the pile thread 8 and for forming the two layer portions 7, 9.

The upper layer portion 7 and the lower layer portion 9 respectively involve a double-rib material of single-thread wire, wherein in the illustrated embodiment to provide a water-permeable sieve structure the single-thread wire was processed in such a way as to afford an open surface area of about 30%. That therefore gives the desired water-permeable sieve structure (not visible in the drawing).

Use of the impact absorbing mat illustrated would be such that a surface exposed to impacts of a motor vehicle (for example in the region of the wheel arch or casing or the underside of the vehicle) would be covered with the upper layer portion 7 and that layer portion would be fixed to the surface (for example by gluing, screwing or clamping or clipping). As already mentioned above it is possible to place between the upper layer portion 7 and the exposed surface to be protected an intermediate layer which would then thicken the layer region 300.

FIG. 5 shows the result of measurement of the sound radiation of a sheet metal portion which was 0.8 mm in thickness and which was excited by a stone strike. The outside surface of the sheet metal which was exposed to the stone strike excitation was covered with the impact absorbing mat according to the invention (curve 1), a layer of polyethylene (curve 2) or polypropylene (curve 3) whose thickness was 3 mm in each case or with an impact absorbing material of the state of the art (curve 4). Curve 4 involves a wheel arch liner of polypropylene which is used in mass production in the motor vehicle industry. The impact absorbing mat used (curve 1) involved a total thickness (sum of the layers 100 through 300 as shown in FIG. 4) of 7 mm, the lower layer portion 9 and the upper layer portion 7 respectively each being of a thickness of 1 mm. The thickness of the layer region 200 was therefore 5 mm. In other respects the impact absorbing mat fully corresponded to FIG. 4 and was made from a single-thread pile thread of polyester of a thickness of 0.2 mm. An intermediate layer of polypropylene was disposed between the upper layer portion 7 and the sheet metal of 0.8 mm gauge.

The four curves 1 through 4 show the sound radiation in relation to bare sheet metal of 0.8 mm gauge in respect of analysis in third-octave steps. The sound pressure level difference (specified in dB) is plotted against the center frequency in Hz. Stone strike excitation was effected with a stone striking machine.

As can be seen from FIG. 5 the frequency range at which the sound radiation is less than with bare sheet metal already begins at about 900 Hz in the case of the impact absorbing mat according to the invention (curve 1). In the case of the material of the state of the art (curve 4) which is used in mass production, sound radiation which is lower in comparison with bare sheet metal is first produced as from about 3,200 Hz, while in the case of PE (curve 2) and PP (curve 3) it is even produced only from about 5,000 Hz.

Particularly significant is the range of between about 500 and 2,500 Hz because it is here that the human ear has its greatest sensitivity. The impact absorbing mat according to the invention also has advantageous properties in that range. Between 500 and 900 Hz sound radiation is admittedly greater than with bare sheet metal, but considered in absolute terms it is less than that of the comparative materials. In the range of between 900 and 2,500 Hz sound radiation is already less than with bare sheet metal, in which respect, as mentioned above, this is only achieved at about 3,200 and 5,000 Hz respectively in the case of the comparative materials. The sound pressure level difference (dB) in comparison with bare sheet metal over the entire frequency range is also greater than with the comparative materials.

The Figure therefore shows that the impact absorbing mat according to the invention has excellent properties in relation to damping of the production of noise in the event of stone strikes.

FIG. 6 is a sectional view of a "test arrangement for testing anti-spray arrangements of the water absorber type" in accordance with the specified EEC Directive. That test arrangement is used in testing anti-spray systems for which EEC type approval is to be requested.

Shown in FIG. 6 is a testpiece 60 which is arranged in front of a support wall 61 in such a way that the front side 62 of the testpiece 60 faces towards a spray device 64 and the rear side 63 bears against the support wall 61. The support wall 61 and the test piece 60 stand in a rectangular collecting container 65, the volume of which is not entirely filled. The rear side of the support wall 63 bears against the wall of the collecting container 65, which is remote from the spray device 64, so that its free volume is between the spray device 64 and the front side 62 and water draining off thereon can collect in the collecting container 65 and can drain away by way of a discharge 66.

The spray device has a straight tube 67 which extends parallel to the testpiece 60, with a water feed 68. The side of the tube 67 which is towards the testpiece 60 carries bores in three planes so that water supplied thereto issues from the bores and is sprayed towards the front side 62 of the testpiece 60 at three angles (15°, 22.5° and 30°).

In accordance with the EEC Directive the test arrangement is of the dimensions set forth in Table 1 and is operated with the specified parameters. The test conditions which occur as a result are to be deemed very severe. The water is put under really high pressure and issues in the form of a thin jet from the bores in the tube 67, which, upon impingement on the absorber material, means that it is immediately severely deformed and therefore partially inactivated. Only materials which are of a highly complex configuration and therefore generally expensive are so efficient that, under those test conditions, they satisfy the required test result of 70%. An example of such a material is the water absorber for an anti-spray system of DE-A1 42 13 404 or DE-A1 42 15 091, where the problem is resolved with an impingement zone which, in the water ingress direction, lies behind a transmission layer with a high level of water permeability and which can possibly be stabilised by spacers.

TABLE 1

Test arrangement in accordance with the EEC Directive

| | |
|---|---|
| Testpiece 62: | 500 mm, height 750 mm |
| Tube 67: | diameter 54 mm, length 300 mm; 12 bores of a diameter each of 1.68 mm in three planes (lower plane 5 bores, central plane 4 bores, upper plane 3 bores; spray angle of the rows of bores 15°, 22.5° and 30° respectively); distance of the tube 67 from the testpiece 62: 500 mm |
| Collecting container: | length 500 mm, width (depth) 75 mm |
| Test/assessment: | at least 90 l of water is sprayed at a rate of 0.675 l/s. The water collected in the collecting container 65 is determined as a relationship in percent in relation to the water sprayed onto the workpiece. |

TABLE 1-continued

Test arrangement in accordance with the EEC Directive

| | |
|---|---|
| | In order to obtain EEC type approval the amount of water collected must be at least 70% of the amount sprayed onto the workpiece. |

TABLE 2

Spray protection in accordance with the EEC Directive

| | |
|---|---|
| Water absorbing mat upper/lower layer portion | double-rib knitted material PES*-single-thread, thickness 0.18 mm/PES-multi-thread dtex 167/2 |
| Pile thread | PES-single-thread, thickness 0.3 mm |
| Mat thickness | 10 mm |
| Thickness of the layer 200 (FIG. 4) | 8 mm |
| Open surface area of the sieve structure | 30% |
| Spray protection obtained | 62.5% (= 89% of the test criterion) |

*PES = polyester

On the basis of the specified parameters even a water absorber which attains the test criterion required by the EEC Directive, with only slight shortfalls, represents a material which is extremely valuable in a practical context. An embodiment of the impact and water absorbing mat according to the invention attained a spray protection level of 62.5% (measured in accordance with the EEC Directive), which corresponds to about 89% of the test criterion. Details in this respect are to be found in Table 2. The material defined therein represents the best embodiment at the present time in respect of water absorbtion, but it is to be assumed that this material can still be optimised and anti-spray protection can be increased. An advantage of the mat according to the invention, which is not to be underestimated however is that it has at the same time impact and water absorbing properties.

I claim:

1. A tee-off golfing mat comprising an upper, artificial turf layer (5) and a bottom, ground layer (6), said upper artificial turf layer including a hardened stabilization material (3) comprising a lower backing material (2) and an upper stabilization layer (4), said upper stabilization layer (4) having anchored therein a plurality of piles (1), and secured to the lowermost surface of the backing material (2), said bottom ground layer (6) which comprises an impact absorbing damping layer (10) and a bottom layer (15), the impact damping layer (10) comprising a spacing material (50) including an upper layer portion (7) and a lower layer portion (9), both formed of a multi-thread yarn with an elastic resilient pile thread (8) continuously threaded back and forth between the upper layer portion (7) and the lower layer portion (9) to impart to the spacing material (50) a stabilizing effect and flexibility.

2. A tee-off golfing mat as claimed in claim 1, wherein the elastic resilient pile thread (8) is a single wire.

3. A tee-off golfing mat as claimed in claim 1, wherein the upper layer portion (7) and the lower layer portion (9) are anchored respectively in an upper carrier layer (11) and a lower carrier layer (12).

4. A tee-off golfing mat as claimed in claim 1, wherein the hardened stabilization material (3) is a solidified plastic of polyvinyl chloride, acrylate, butadiene styrene, polyamide, polyurethane, polyester, mixed or graft polymers of polyvinyl chloride, polyethylene, ethylene vinyl acetate, rubber, polyvinyl chloride/acrylate mixtures or latex, or a solidified adhesive.

5. A tee-off golfing mat as claimed in claim 1, wherein the pile (1) comprises single-thread portions of polyethylene, polypropylene, polyvinyl chloride, polyamide, polyacrylonitrile, polyester, or polyvinyl chloride-vinyl.

6. A tee-off golfing mat as claimed in claim 1, wherein the backing material (2) is a tufted, woven, knitted or double-rib material, a spun fleece or a needle felt.

7. A tee-off golfing mat as claimed in claim 1, wherein the upper stabilization layer (4) is provided with at least one hole (20) for receiving a tee (21).

8. A tee-off golfing mat as claimed in claim 1, wherein the upper stabilization layer (4) is provided with at least one longitudinal slot (22) for receiving a preselected number of tees (21).

9. A tee-off golfing mat comprising an upper, artificial turf layer (5) and a bottom, ground layer (6), said upper artificial turf layer including a hardened stabilization material (3) comprising a lower backing material (2) and an upper stabilization layer (4), said upper stabilization layer (4) having anchored therein a plurality of piles (1), the thickness of the stabilization layer (4) being between 1 and 5 mm, and secured to the lowermost surface of the backing material (2), said bottom ground layer (6) which comprises an impact absorbing damping layer (10) and a bottom layer (15), the impact damping layer (10) comprising a spacing material (50) including an upper layer portion (7) and a lower layer portion (9) with an elastic resilient pile thread (8) continuously threaded back and forth between the upper layer portion (7) and the lower layer portion (9) to impart to the spacing material (50) a stabilizing effect and flexibility.

10. A tee-off golfing mat as claimed in claim 9, wherein the length of the piles (1) is between 5 and 15 mm.

11. A tee-off golfing mat as claimed in claim 9, wherein the upper layer portion (7) and the lower layer portion (9) are anchored respectively in an upper carrier layer (11) and a lower carrier layer (12).

12. A tee-off golfing mat as claimed in claim 9, wherein the hardened stabilization material (3) is a solidified plastic of polyvinyl chloride, acrylate, butadiene styrene, polyamide, polyurethane, polyester, mixed or graft polymers of polyvinyl chloride, polyethylene, ethylene vinyl acetate, rubber, polyvinyl chloride/acrylate mixtures or latex, or a solidified adhesive.

13. A tee-off golfing mat as claimed in claim 9, wherein the pile (1) comprises single-thread portions of polyethylene, polypropylene, polyvinyl chloride, polyamide, polyacrylonitrile, polyester, or polyvinyl chloride-vinyl.

14. A tee-off golfing mat as claimed in claim 9, wherein the backing material (2) is a tufted, woven, knitted or double-rib material, a spun fleece or a needle felt.

15. A tee-off golfing mat as claimed in claim 9, wherein the upper stabilization layer (4) is provided with at least one hole (20) for receiving a tee (21).

16. A tee-off golfing mat as claimed in claim 9, wherein the upper stabilization layer (4) is provided with at least one longitudinal slot (22) for receiving a preselected number of tees (21).

* * * * *